US012785944B2

(12) United States Patent
Labonne et al.

(10) Patent No.: US 12,785,944 B2
(45) Date of Patent: Nov. 3, 2026

(54) METHOD FOR TRANSMITTING CONTENT WITH THE AID OF A QUANTUM KEY DISTRIBUTION NETWORK

(71) Applicant: Airbus Defence and Space SAS, Toulouse (FR)

(72) Inventors: Maxime Labonne, Elancourt (FR); Marc Cartigny, Elancourt (FR); Claude Poletti, Elancourt (FR); Jorge-Eleazar Lopez-Coronado, Elancourt (FR)

(73) Assignee: Airbus Defence and Space SAS, Toulouse (FR)

( * ) Notice: Subject to any disclaimer, the term of this patent is extended or adjusted under 35 U.S.C. 154(b) by 182 days.

(21) Appl. No.: 18/428,377

(22) Filed: Jan. 31, 2024

(65) Prior Publication Data

US 2025/0240153 A1 Jul. 24, 2025

(30) Foreign Application Priority Data

Feb. 2, 2023 (FR) ....................................... 2300974

(51) Int. Cl.
*H04L 9/08* (2006.01)
*H04L 9/32* (2006.01)

(52) U.S. Cl.
CPC .......... *H04L 9/0852* (2013.01); *H04L 9/0861* (2013.01); *H04L 9/3236* (2013.01)

(58) Field of Classification Search
CPC .... H04L 9/0852; H04L 9/0861; H04L 9/3236
See application file for complete search history.

(56) References Cited

U.S. PATENT DOCUMENTS

2008/0144836 A1* 6/2008 Sanders .................. H04L 9/085 380/278
2017/0237559 A1* 8/2017 Yuan ..................... H04L 9/0852 380/283

(Continued)

FOREIGN PATENT DOCUMENTS

EP 3780482 A1 2/2021
EP 3907927 A1 * 11/2021 ........... H04L 9/0855

(Continued)

OTHER PUBLICATIONS

French Search Report for corresponding French Patent Application No. 2300974 dated Jul. 20, 2023.

(Continued)

*Primary Examiner* — Darshan I Dhruv
(74) *Attorney, Agent, or Firm* — Greer, Burns & Crain, Ltd.

(57) ABSTRACT

A method for transmitting content in a communication network comprising a quantum key distribution network of quantum keys, the communication network comprising a key manager device connected to transmission nodes and connected to the quantum key distribution network, the transmission nodes communicating in the communication network and transmitting and receiving quantum keys in the quantum key distribution network, the method comprising sending and receiving control messages to and from the control plane manager to organize the transfer of the content in the communication network. The control messages comprise hash values to identify quantum keys. Also a control plane manager device, a transmission node, and a computer program.

7 Claims, 11 Drawing Sheets

(56) References Cited

U.S. PATENT DOCUMENTS

| | | | | |
|---|---|---|---|---|
| 2019/0260581 | A1* | 8/2019 | Su | H04L 9/08 |
| 2023/0188334 | A1 | 6/2023 | Li et al. | |
| 2024/0204997 | A1* | 6/2024 | Cartigny | H04L 9/0855 |
| 2024/0204999 | A1* | 6/2024 | Tong | G06F 21/64 |

FOREIGN PATENT DOCUMENTS

| | | | | | |
|---|---|---|---|---|---|
| GB | 2602208 | A | * | 6/2022 | H04L 9/14 |
| WO | WO-2014035696 | A2 | * | 3/2014 | H04L 9/50 |
| WO | WO-2023000075 | A1 | * | 1/2023 | H04L 9/0855 |

OTHER PUBLICATIONS

Xuefu Wang Quantumctek Co et al., "Proposal on the Key Relay Function of Key Management of Quantum Key Distribution Network; C22" retrieved from https://www.itu.int.ifa/t/2017/sg13/exchange/wp3/q16/201905/Contributions/C22 Proposal on the Key Relay Function of Key Management of Quantum Key Distribution Network. docx, May 7, 2019; vol. 16/13, pp. 1-3.

K. Kenyoshi NICT Japan "Draft New Recommendation ITU-T Y.3803 (formerly Y.QKDN_KM): Key Management for Quantum Key Distribution Networks" retrieved from https://www.itu.int.ifa/t/2017/sg11/docs/201218/td/ties/gen/T17-SG11-201218-TD-GEN-1475!! ZIP-E.ziptd1475_ils_SG13_att2.docx, Oct. 5, 2020; pp. 1-23.

* cited by examiner

METHOD FOR TRANSMITTING CONTENT WITH THE AID OF A QUANTUM KEY DISTRIBUTION NETWORK

CROSS-REFERENCES TO RELATED APPLICATIONS

This application claims the benefit of French Patent Application Number 2300974 filed on Feb. 2, 2023, the entire disclosure of which is incorporated herein by way of reference.

FIELD OF THE INVENTION

The present invention relates to a secure method for transmitting content between two transmission nodes of a communication network comprising a quantum key distribution network and a control plane manager device tasked with the sequencing of operations that are useful to the transmission of content in the network. At least one embodiment relates to an improved transmission of an encryption key between two transmission nodes of a communication network. The invention relates more particularly to the reduction of the attack surface during such a transmission of content.

BACKGROUND OF THE INVENTION

Transferring an encryption key, also commonly referred to as cryptographic key, in a secure manner between two transmission nodes of a communication network, with the aid of a quantum key distribution network, is known. Such a transfer of an encryption key, which means that it can be shared between two participants, i.e., its emitter and its recipient, is with the aim of then carrying out encrypted communications between these two participants. A quantum key distribution network is considered to be "quantum" insofar as it handles keys referred to as quantum keys, for which interception difficulty is based not on an assumed computational (mathematical) difficulty of a problem (as is the case for a number of cryptographic methods), but on fundamental properties of quantum physics applied to photon particles. The implementation of a quantum key exchange is based on a capacity to generate random quantum objects, to measure these quantum objects and to then transmit them over sufficient distances, for example between two transmission nodes of a communication network, at a quantum communication layer using optical means. The security of quantum key exchange protocols is based on the assumption that, according to a no-cloning theorem, an adversary cannot learn the state of a particle before it is measured and a measurement of the state of a quantum particle alters its state. This security therefore relies on a property of quantum physics.

Methods for sharing a symmetric encryption key between a transmitter and a recipient connected to the same communication network use quantum transmission nodes each configured to carry out transmissions in a conventional communication layer, for example according to an IP protocol, and to carry out only quantum key transmissions in an optical quantum communication layer, referred to as quantum layer, making use of a key manager device connected to the transmission nodes. According to these methods, the key manager device used receives intermediate results of a quantum key derivation function, which function exhibits particular properties, from a source transmission node (transmitter of the encryption key to be shared) and from one or more intermediate transmission nodes, between which quantum keys circulate, and then transmits to a recipient transmission node (receiver of the encryption key to be shared) a final result of operations executed by the key manager device, from which the recipient transmission node can recover the encryption key to be shared, without it circulating in the communication network and without it being possible to recover it from an intermediate result transmitted in the communication network. Such an encryption key sharing method is described in the part of the description of the present application, with reference to FIG. 1 and FIG. 2, in an example according to which a key derivation function KDF is the function referred to as exclusive or, or commonly called xor, the operator of which is represented here by the symbol "$\oplus$", applied to two items of data referred to as input data. Although this principle of transferring a key between a source transmission node and a recipient transmission node is known, it is not widely used for the transmission of any content through a communication network, such as for example a mesh network, insofar as there is no control protocol dedicated to implementing such a transfer via a plurality of transmission nodes operating in a communication network and additionally being included in a quantum key distribution network. There is additionally a constant need for enhancing the security of transfers of content in such a communication network and the situation can be improved.

SUMMARY OF THE INVENTION

An object of the present invention is to reduce the attack surface of a secure transmission of content in a communication network by increasing the transmission security level offered by encryption key sharing methods by virtue of a quantum key distribution network.

To this end, there is proposed a method for transmitting content between two transmission nodes of a communication network comprising these two transmission nodes and at least one other transmission node referred to as intermediate transmission node, the transmission nodes being additionally contained in a quantum key distribution network of keys referred to as quantum keys, the communication network comprising a key manager device connected to said transmission nodes and connected to said quantum key distribution network, the transmission nodes each comprising a plurality of communication interfaces to communicate in the communication network and a plurality of quantum key transmission interfaces to transmit and receive said quantum keys in said quantum key distribution network, and the transmission nodes being additionally configured to each carry out a key derivation function and to direct the result thereof to said key manager device, and to each carry out a key extraction function based on information received from the key manager device and a received quantum key, said communication network additionally comprising a control plane manager device configured to execute the following steps:

- receive, from a node, referred to as source node, from among said two transmission nodes, a message requesting transmission of said content to the other node, referred to as recipient node, from among said two transmission nodes, said request message containing an identifier of said recipient node,
- obtain a route determined as passing through said at least one intermediate transmission node or through a series of intermediate transmission nodes between said source node and said recipient node, and a service identifier for transmission of said content associated with said route, send and receive control messages to and from said transmission nodes and to said key manager device, suitable for generating transmissions of keys between pairs of nodes from among said nodes, defined according to said determined route in association with said transmission service identifier, the transmission method being such that, when a control message transmitted to or from said control plane manager contains an identifier of a quantum key that is transmitted or to be transmitted between two transmission nodes, this identifier is a hash value of said quantum key that is transmitted or to be transmitted.

Thus, it is advantageously possible to transmit any end-to-end content between a source transmission node and a recipient transmission node of a communication network comprising a quantum key distribution network, by virtue of simple and centralized management, and offering an increased level of security insofar as quantum key identifiers transmitted between the transmission nodes and the control plane manager device are each done so in the form of a hash value of a quantum key.

The method according to the invention can also include the following characteristics considered alone or in combination:

- the sending and the receiving of said control messages comprises:
  - sending, to said key manager device, a control message containing said transmission service identifier,
  - sending, to said source node, a control message containing at least said service identifier and an identifier of a quantum keys emission interface,
  - receiving, from said source node, a control message comprising at least a quantum key identifier in the form of a hash value of said quantum key and said service identifier for transmission of said content,
  - sending, to each intermediate transmission node, a control message containing at least said service identifier, a quantum key reception interface identifier, and an identifier of a quantum key that is received or to be received in the form of a hash value of said quantum key via said quantum key reception interface, and a quantum key emission interface identifier,
  - receiving, from each intermediate transmission node, a control message containing at least a quantum key identifier in the form of a hash value of said quantum key and said service identifier for transmission of said content,
  - sending, to said key manager device, a control message containing an end-of-sequence identifier and an identifier of the recipient node, and,
  - sending, to said recipient node, a control message containing at least said service identifier, a quantum key reception interface identifier and a quantum key identifier in the form of a hash value of said quantum key that is received or to be received via said quantum key reception interface.
- the sending of the control message to said source node and the sending of a control message to each of said intermediate nodes additionally comprise a unique sequence identifier of a series of unique sequence identifiers which series is determined for said transmission of said content in association with said service identifier, each unique sequence identifier of said series of unique sequence identifiers being suitable for determining the rank of a sequence with which it is associated in a series of sequences which is defined in association with said transmission of said content.

Advantageously it is thus possible to use a non-commutative key derivation function KDF and to carry out a rerouting during transmission in the event of malfunctioning of a link in the communication network.

- the key derivation function exhibits properties according to which said function is applied to two data items, referred to as input data, and the result of said function applied to said two data items is null when said two data items are equal to each other and the result of said function applied to said two data items is equal to one of said two data items when the other of said two data items is null.
- the key derivation function is a function referred to as "exclusive OR" and said two data items exhibit the form of binary words of identical size.

Another subject of the invention is a communication network comprising a control plane manager device configured to control transmission of content between two transmission nodes of said communication network additionally comprising at least one other transmission node referred to as intermediate transmission node, said transmission nodes being additionally contained in a quantum key distribution network of keys referred to as quantum keys, the communication network comprising a key manager device connected to said transmission nodes and connected to said quantum key distribution network, the transmission nodes each comprising a plurality of communication interfaces to communicate in the communication network and a plurality of quantum key transmission interfaces to transmit and receive said quantum keys in said quantum key distribution network, and said transmission nodes being additionally configured to each carry out a key derivation function and to direct the result thereof to said key manager device and to each carry out a key extraction function based on information received from said key manager device and a quantum key, said communication network additionally comprising a control plane manager device, said control plane manager device comprising the electrical and electronic circuitry configured to:

- receive, from a node, referred to as source node, from among said two transmission nodes, a message requesting transmission of said content to the other node, referred to as recipient node, from among said two transmission nodes, said request message containing an identifier of said recipient node,
- obtain a route determined as passing through said at least one intermediate transmission node or through a series of intermediate transmission nodes between said source node and said recipient node, and a service identifier for transmission of said content associated with said route,
- send and receive control messages to and from said transmission nodes or to said key manager device, suitable for generating transmissions of quantum keys between pairs of nodes from among said nodes, defined according to said determined route in association with said transmission service identifier,
- the communication network being configured such that, when a control message transmitted to or from said control plane manager contains an identifier of a quantum key that is transmitted or to be transmitted between two transmission nodes, this identifier is a hash value of the quantum key that is transmitted or to be transmitted.

The control plane manager device according to the invention can also include the following characteristics, considered alone or in combination:

The control plane manager device additionally comprises electronic circuitry configured to:

send, to said source node, a control message containing at least said service identifier, and an identifier of a quantum key emission interface, receive, from said source node, a control message containing at least a quantum key identifier in the form of a hash value of said quantum key and said service identifier for transmission of said content, send, to each intermediate transmission node, a control message containing at least said service identifier, a quantum key reception interface identifier and a quantum key identifier in the form of a hash value of said quantum key that is received or to be received via said quantum key reception interface, and a quantum key emission interface identifier, receive, from each intermediate transmission node, a control message containing at least one quantum key identifier in the form of a hash value of said quantum key and said service identifier for transmission of said content, send, to said key manager device, a control message containing an end-of-sequence identifier and an identifier of the recipient node, and, send, to said recipient node, a control message containing at least said service identifier, a quantum key reception interface identifier and a quantum key identifier in the form of a hash value of said quantum key that is received or to be received via said quantum key reception interface.

The control plane manager device additionally comprises electronic circuitry configured to insert into the control message to said source node and into the control message to each of said intermediate nodes a unique sequence identifier of a series of unique sequence identifiers which series is determined for said transmission of said content in association with said service identifier, each unique sequence identifier of said series of unique sequence identifiers being suitable for determining the rank of a sequence with which it is associated in a series of sequences which is defined in association with said transmission of said content.

The invention furthermore relates to a communication network comprising a plurality of transmission nodes, a key manager device and a control plane manager device as described previously, in which each of the transmission nodes is additionally configured to:

send a message to the key manager device, said message directed to said key manager device containing a key derivation function result, said service identifier and a sequence identifier of a series of unique sequence identifiers which series is determined for said transmission of said content in association with said service identifier, each unique sequence identifier of said series of unique sequence identifiers being suitable for determining the rank of a sequence with which it is associated in a series of sequences which is defined in association with said transmission of said content, and receive from said key manager device a message containing said service identifier and a key derivation function result.

Another subject of the invention is a transmission node in a quantum key distribution network, the transmission node being configured to carry out, from the at least one quantum key, a key derivation function or a key extraction function, the transmission node comprising means of generation, storage, reception and transmission of a quantum key, the transmission node additionally comprising means of reception and emission of control messages suitable for carrying out, in combination with a key manager device and a control plane manager device, a method for transmitting content in a communication network comprising the transmission node, and the transmission node being such that it comprises electronic and/or computing-related circuitry configured to, when a quantum key is required to be sent from the transmission node:

carry out a hash function having as input variable said quantum key that is transmitted or to be transmitted, transmit a first hash value, result of said hash function applied to said quantum key that is transmitted or to be transmitted, the first hash value acting as an identifier of the quantum key according to the content transmission method, and configured to, from a quantum key received by said transmission node:

carry out said hash function having as input variable the received quantum key to obtain a second hash value and save in a memory the second hash value in association with said received quantum key, receive, the first hash value acting as a quantum key identifier, and, identify a received quantum key, by comparing the first hash value with a list of hash values containing the second hash value determined.

Another subject of the invention is a computer program product comprising program code instructions for executing the steps of a method such as that described previously, when this program is executed by a processor of a control plane manager device.

Lastly, the invention relates also to a storage medium containing a computer program product as mentioned above.

BRIEF DESCRIPTION OF THE DRAWINGS

The abovementioned features of invention, as well as others, will become clearer upon reading the following description of an example embodiment, said description being made with reference to the appended drawings.

DETAILED DESCRIPTION OF THE PREFERRED EMBODIMENTS

Figure 1:
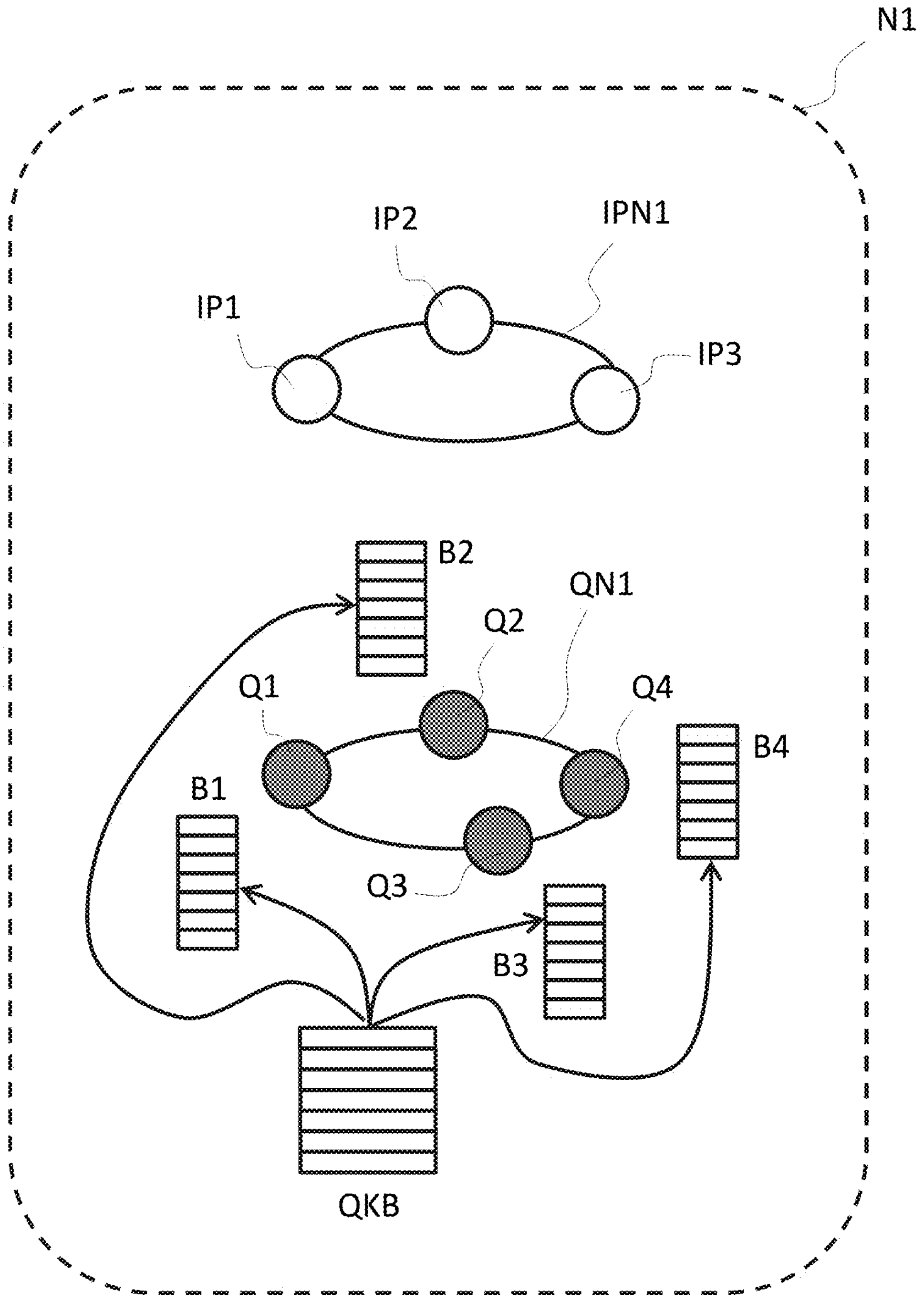
FIG. 1 schematically illustrates a transmission node of a communication network comprising an IP network communication module and a quantum key communication module.

FIG. 1 schematically illustrates a transmission node N1 configured to communicate in an IP (Internet Protocol) communication network and to participate in a quantum key distribution network suitable for the transmission of quantum keys between two adjacent transmission nodes. The term "adjacent transmission nodes" here denotes equally a physical proximity or logical proximity and corresponds to two transmission nodes likely to transmit to one another without the data that is transmitted transiting via an intermediate communication node. The transmission node N1 can be integrated in any communication equipment, such as a router or an encryptor, for example. The transmission node N1 comprises a communication module IPN1 configured to carry out communications in an IP communication network. The transmission node IPN1 comprises communication interfaces each suitable for carrying out data transmissions in an IP communication network. According to the example described, the transmission node N1 comprises a communication interface IP1, a communication interface IP2 and a communication interface IP3, all suitable for carrying out data transmissions via an IP communication network. The transmission node N1 furthermore comprises a communication module QN1, referred to as a quantum module (of a type usually called "QKDnode"), configured for the generation, storage and transmission of quantum keys. The quantum module QN1 comprises interfaces Q1, Q2, Q3 and Q4, referred to as quantum interfaces, each configured to carry out transmissions of quantum keys via optical transmission means. The quantum interfaces Q1, Q2, Q3 and Q4 are notably each provided to transmit quantum keys to similar interfaces (configured for reception) of a similar transmission node, for example to an adjacent node of the same communication network performing QKDnode quantum node functions in a quantum key distribution network. The quantum interfaces Q1, Q2, Q3 and Q4 are additionally each configured to receive quantum keys from an external source, via optical transmission means, for example from an adjacent node of the same communication network performing QKDnode quantum node functions in a quantum key distribution network. According to one embodiment, the optical means are configured for the transmission of quantum keys through optical fibres or via laser technology communication means, commonly referred to as "Laser in the air". Each of the quantum interfaces Q1, Q2, Q3 and Q4 comprises a quantum key storage buffer memory supplied with quantum keys from a quantum key generator QKB. Thus, the quantum interface Q1 comprises a quantum key storage buffer memory B1; the quantum interface Q2 comprises a quantum key storage buffer memory B2; the quantum interface Q3 comprises a quantum key storage buffer memory B3, and the quantum interface Q4 comprises a quantum key storage buffer memory B4. According to an example embodiment, the quantum key generator QKB supplies each of the storage buffer memories such that a quantum key can be delivered to a determined quantum interface when a quantum key transmission is necessary. For example, the quantum key generator QKB fills each of the buffer memories with the same predefined number of quantum keys before a first quantum key transmission takes place, then maintains a fill level in each of the quantum key buffer memories B1, B2, B3 and B4 as quantum keys are transmitted by the quantum module QN1. According to one embodiment, the quantum keys generated and stored in the quantum key storage buffer memories exhibit a predefined fixed size (width). According to a variant embodiment, the size of a quantum key can be adjusted as a function of operating parameters which are themselves adjusted according to specific needs during use, possibly dynamically. According to one embodiment, the communication module IPN1 and the quantum module QN1 are controlled by the same control unit configured to synchronize their operation. Thus, for example, a control message can be received by the transmission node N1 via the communication module IPN1 and can be interpreted by the control unit of the transmission node N1 with the aim of generating a transmission of a quantum key via one of the quantum interfaces Q1, Q2, Q3 and Q4. According to a variant embodiment, quantum keys are generated for each of the quantum interfaces Q1, Q2, Q3 and Q4 and are transmitted to an adjacent transmission node when that is necessary, under the control of a dedicated control unit for the transmission node N1.

An example internal architecture of the internal control unit of the transmission node N1 is described later with reference to FIG. 5.

The representation of the transmission node N1 in FIG. 1 does not feature all these components, for the purposes of simplification. For example, the transmission node N1 comprises an electronic control unit with microprocessor(s), and this is not represented in FIG. 1 insofar as such implementation details of the transmission node N1 are not useful for a good understanding of the invention. According to a similar principle, the implementation details of the quantum key generator QKB are not expanded upon here. The quantum key generator QKB of the transmission node N1 uses a random quantum generator followed by a logical key generation system QKD (Quantum Key Distribution) coupled with an optical encoding of the keys which are then suitable for circulating on an optical fibre. According to an example embodiment, the quantum key generator QKB employs splitting of an optical beam of a continuous laser diode using an electro-optical modulator or by electrically pulsing a diode. According to the example represented in FIG. 1, the communication module IPN1 of the transmission node N1 comprises three communication interfaces IP1, IP2 and IP3 and the quantum module QN1 of the communication node IPN1 comprises four quantum interfaces Q1, Q2, Q3 and Q4. This example is however not limiting and a similar communication node can comprise a different number of communication interfaces and a different number of quantum interfaces.

The transmission node N1 is furthermore configured to be able to transmit to an external device, such as for example a key manager device, a result of a key derivation function KDF applied to two items of data referred to as input data. For example, the transmission node N1 is configured to receive a first item of data via one of its communication interfaces IP1, IP2 or IP3 and to then carry out a key derivation function KDF, such as for example the "exclusive OR" function, also commonly called the xor function, and the operator of which is often represented by the symbol "⊕", between this first data item and a second input data item, and to then direct the result of this key derivation function applied to the two input data items to a third-party device, via one of the communication interfaces IP1, IP2 and IP3. According to one example, the first input data item is a quantum key received via optical transmission means, from an adjacent transmission node connected to the node N1. According to another example, the first input data item is a data item received from an application layer, such as content to be transmitted in a communication network comprising the transmission node N1, or a fragment of such content.

The transmission node N1 can be associated with other similar transmission nodes to form a communication network, for example a mesh or partial mesh communication network.

Figure 10:
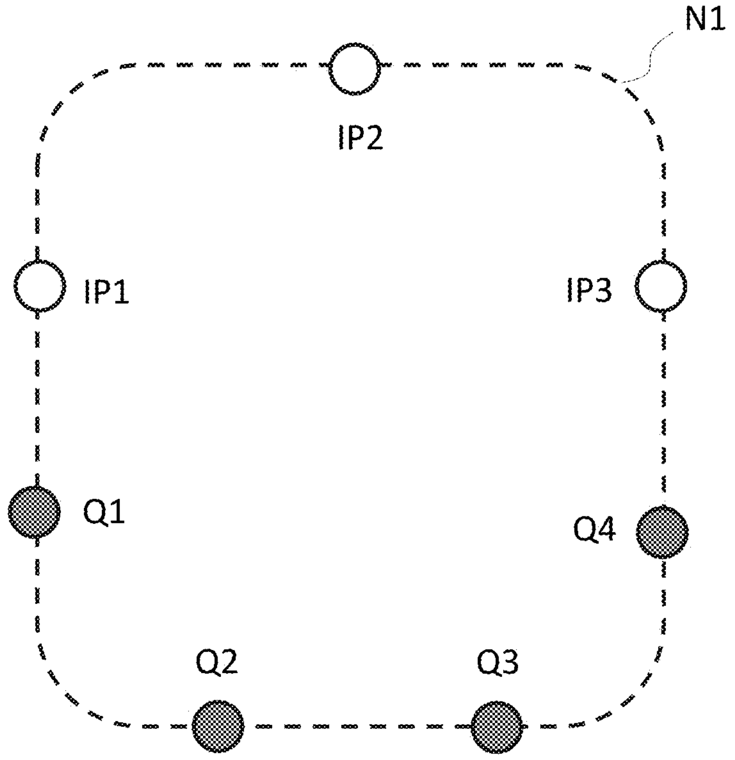
FIG. 10 is a schematic representation of a transmission node of the communication network already described in FIG. 3.

In the present description, a quantum key generated by the transmission node N1 and transmitted via the quantum interface Q1 of this transmission node N1 is designated k11; a quantum key generated by the node N1 and transmitted via the quantum interface Q2 of this transmission node N1 is designated k12; and so on. More generally, a quantum key generated by a transmission node Nn and transmitted via an interface Qj of this transmission node Nn is called quantum key Knj. According to one embodiment, each quantum key transmitted by the transmission node N1, or more widely by a transmission node similar to the transmission node N1, is accompanied by a quantum key identifier enabling reference to this quantum key to be made by means of this identifier. FIG. 10 is a simplified schematic representation of a transmission node as already described in FIG. 1 according to which the node is referenced by a transmission node identifier (in this case N1) and is characterized in that it comprises IP communication interfaces (in this case IP1, IP2 and IP3, according to the example described) and quantum key transmission interfaces (in this case Q1, Q2, Q3 and Q4, according to the example described). Hereafter in the description, examples of transmission of content in a communication network N are expanded upon. For the purposes of simplification, the communication network N described later comprises, in addition to the transmission node N1 represented here, four transmission nodes N2, N3, N4 and N5 similar to the transmission node N1 and each comprising IP communication interfaces and quantum key transmission interfaces Q suitable for carrying out communications and quantum key transmissions according to the links represented and described between the various transmission nodes. Hereafter in the description, the detail of the IP interfaces and of the quantum interfaces Q is no longer represented but the links between two quantum interfaces are illustrated by dotted lines and the links between IP interfaces are illustrated by continuous lines.

Figure 2:
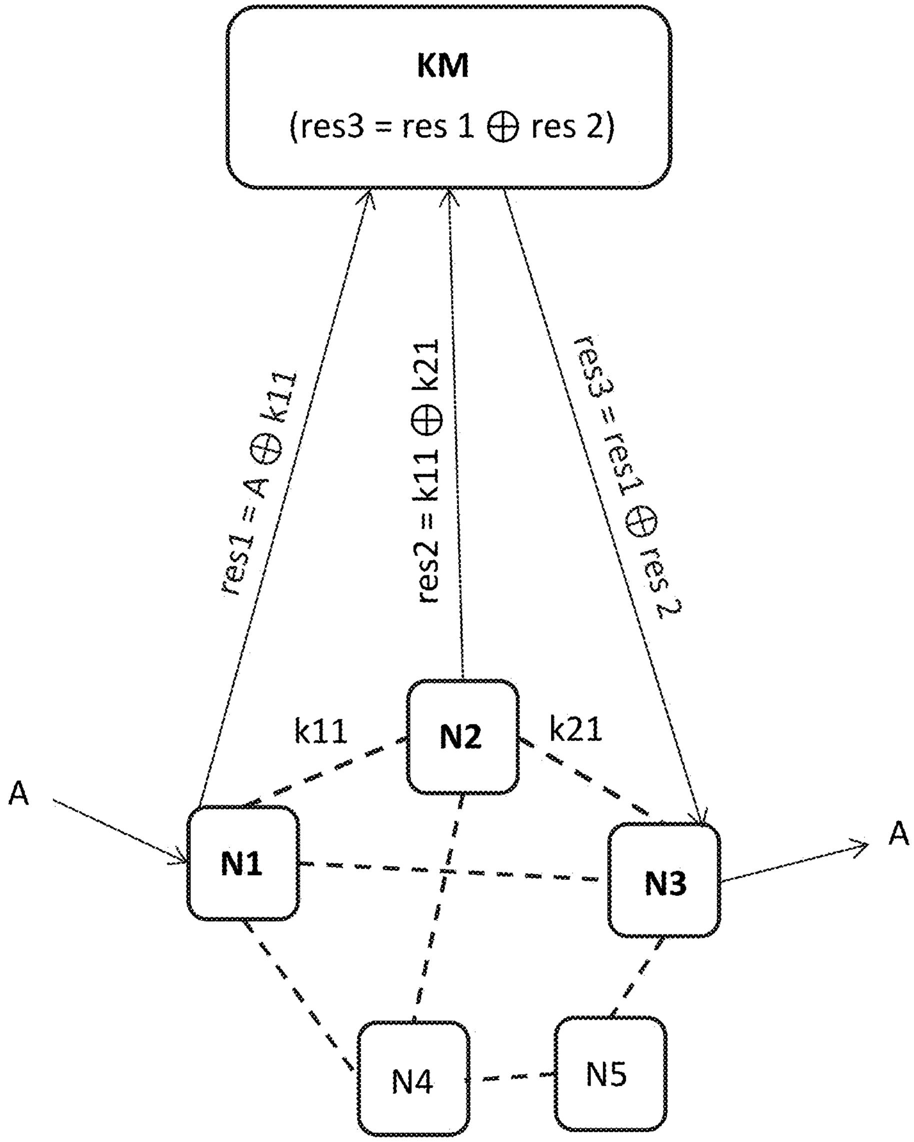
Fig. 2 (Prior Art)
FIG. 2 schematically illustrates a transmission of content between two transmission nodes of a communication network, via an intermediate communication node, according to the prior art.

FIG. 2 illustrates an example of the transmission of content A through a communication network N comprising a quantum distribution network QKDN according to the prior art. The network N comprises the transmission node N1 described previously with reference to FIG. 1 as well as transmission nodes N2, N3, N4 and N5 similar to the transmission node N1, except that the number of communication interfaces in the network N and the number of quantum interfaces of each of the transmission nodes N2, N3, N4 and N5 can vary. According to one embodiment, the network N and the quantum key distribution network QKDN are mesh networks in which communication links exist, established respectively between the transmission nodes N1 and N2, between the transmission nodes N2 and N3, between the transmission nodes N1 and N3, between the transmission nodes N1 and N4, between the transmission node N4 and N5, between the transmission nodes N5 and N3, and between the transmission nodes N2 and N4. Equivalent links exist for that which concerns the quantum key distribution layer, referred to as "quantum layer", between quantum interfaces of these nodes, for the same inter-node links. In other words, a quantum key distribution link exists between the transmission nodes N1 and N2, another quantum key distribution link exists between the transmission nodes N2 and N3, and so on for the pairs of nodes N1 and N3, N1 and N4, N4 and N5, N5 and N3, and lastly N4 and N2. Of course, this example of interconnection of the nodes N1, N2, N3, N4 and N5 for the "conventional" communication layer according to an IP protocol, and for the quantum layer, is not limiting and the quantum meshing can use interconnection links that are different from those established in the quantum layer. According to the example of transmission of content A illustrated with reference to FIG. 2, the transmission node N1 receives, from an application or an application module suitable for communicating with it, a message containing a request to transmit content A to a recipient transmission node. This message is received via one of the communication interfaces of the transmission node N1. According to the example described, the recipient transmission node is the transmission node N3. The transmission node N1, having received the request to transmit content A, is referred to as "source transmission node". According to a non-limiting example, content A to be transmitted is a symmetric encryption key to be used for further secure sharing of content between the transmission nodes N1 and N3 (source and recipient). A transfer of content between the transmission nodes N1 and N3 can be secured by a prior exchange, itself highly secure, of an encryption key by virtue of the procedure described as follows:

i) the transmission node N1 receives content A accompanied by a message requesting transmission of this content, and carries out a key derivation function KDF using the xor function as key derivation function KDF applied to two input data items of the function, which are, on the one hand, the received content A, and, on the other hand, a quantum key k1*l* generated by the transmission node N1 and additionally delivered to the transmission node N2 via the quantum link between the transmission nodes N1 and N2.

A key derivation function result res1 is then directed by the transmission node N1 to a key manager device KM, via a communication link established between the transmission node N1 and the key manager device KM.

ii) The transmission node N2 receives the quantum key k11 emitted by the transmission node N1 via one of its quantum interfaces, and carries out a key derivation function using the xor function as key derivation function KDF applied to two input data items of the function, which are, on the one hand, the received quantum key k11, and, on the other hand, a quantum key k21 generated by the transmission node N2 (and additionally delivered to the recipient transmission node N3 via the quantum link between the transmission nodes N2 and N3). A key derivation function KDF result res2 is then directed by the transmission node N2 to the key manager KM, via a communication link established between the transmission node N2 and the key manager device KM.

iii) The key manager device KM carries out an xor function between the result res1 received from the transmission node N1 and the result res2 received from the transmission node N2, and transmits a result res3 to the recipient transmission node N3, which can then recover content A using the quantum key k21 received and transmitted by the transmission node N2.

An example internal architecture of the key manager device KM is described later with reference to FIG. 6.

According to this example, it is considered that content A (in this case an encryption key intended to secure later exchanges) is transferred between the source transmission node N1 and the recipient transmission node N3 via the transmission node N2, considered in this case to be an intermediate transmission node, which nodes are used jointly in combination with the key manager device KM, such that content A never transits readably in the communication network N but that it can be determined in fine by the recipient transmission node. This possibility is based on properties of the xor derivation function KDF for which:

$$(A \oplus k11) \oplus (k11 \oplus k21) = A \oplus k21$$

The security sought for the transmission of content A is ensured since, although in possession of content A ⊕k21, it is possible to recover content A only with knowledge of the quantum key k21. Now, the transmission security level specific to quantum keys is high insofar as the quantum key distribution network QKDN exhibits the known properties of resistance to a "man in the middle" (MITM) attack since an attempt at reading all or part of a quantum key alters the latter and since a quantum key alteration can be detected by its recipient by virtue of the phenomenon of quantum entanglement. Content A is then available for an application or an application module awaiting it at the recipient transmission node N3.

Content A can be transmitted via a larger number of intermediate transmission nodes. According to another example of transmission, content A can be transmitted from the transmission node N1 (i.e., the source transmission node) to the transmission node N5 (i.e., the recipient transmission node) via the intermediate transmission nodes N2 and N4. According to this other example, successive results of carrying out the two-input key derivation function KDF are sent by the transmission nodes N1, N2 and N4 to the manager KM and quantum keys are directed in the quantum layer between the transmission nodes N1 and N2, then between the transmission nodes N2 and N4 and lastly between the transmission nodes N4 and N5. The key manager device KM then directs to the recipient transmission node N5 a result of the operation carried out by itself:

$$(A \oplus k11) \oplus (k11 \oplus k22) \oplus (k22 \oplus k41) = A \oplus k41,$$

where k11 is the quantum key transmitted between the transmission node N1 and the transmission node N2, k22 is the quantum key transmitted between the transmission node N2 and the transmission node N4, k41 is the quantum key transmitted between the transmission node N4 and the transmission node N5, Content A is in this case transferred according to the same secure transmission principle as in the previous example relating to a transmission of content A between the source transmission node N1 and the recipient transmission node N3.

The use of a method (or protocol) for managing interactions between the various elements of the communication network advantageously provides for transmitting any type of content between two transmission nodes of the communication network N.

Figure 3:
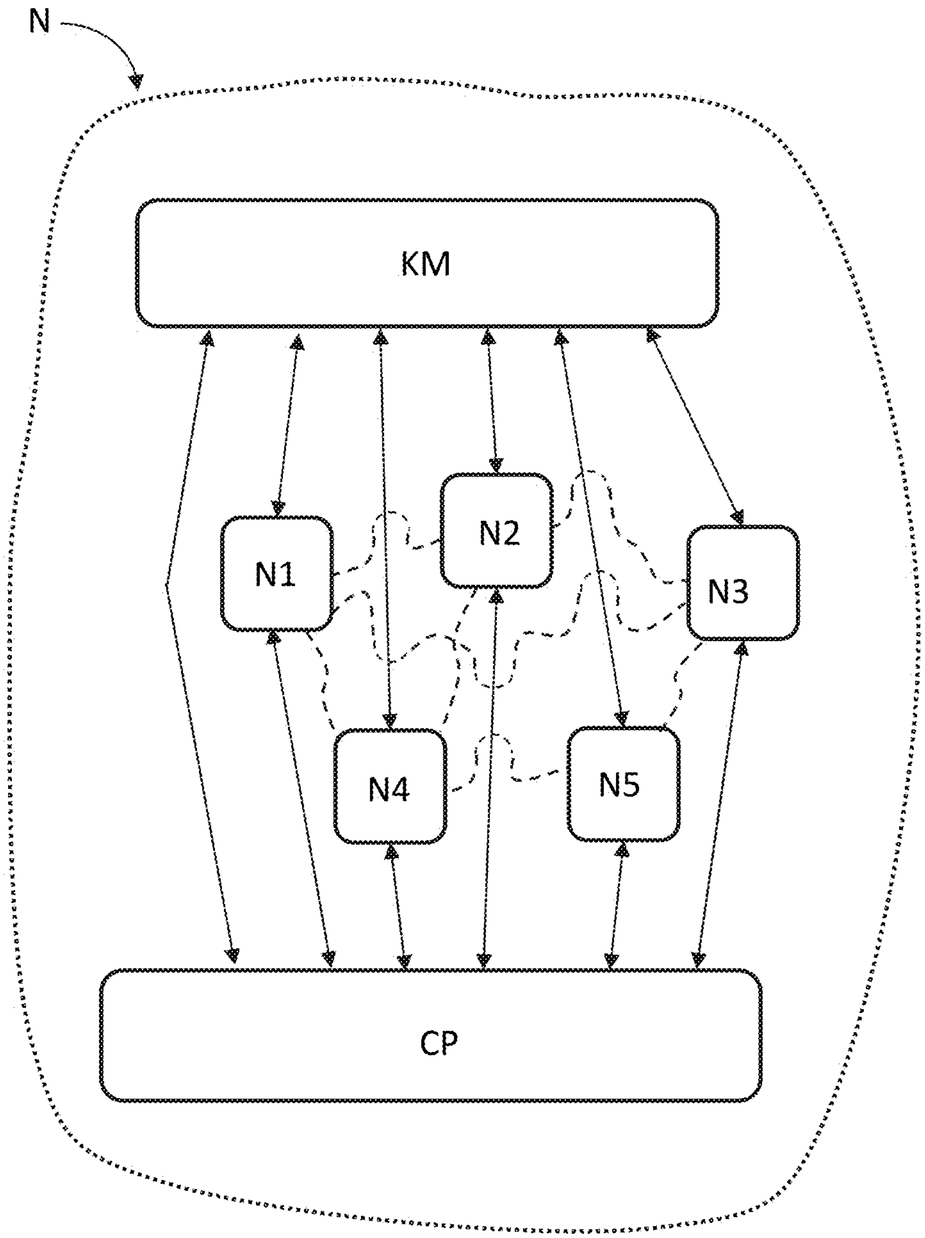
FIG. 3 schematically illustrates a communication network comprising transmission nodes, a key manager device and a control plane manager device, according to one embodiment.

FIG. 3 illustrates a use of a control plane manager device CP for advantageously organizing a sequencing of operations that are useful for the secure transfer of any content between two transmission nodes of the communication network N. According to one embodiment, the control plane manager device CP is centralized, thereby indicating that its resources are concentrated in an item of equipment or a dedicated system, located at a specific place. According to a variant embodiment, the control plane manager device is distributed, which means that, although it can be considered to be a manager system or device dedicated to the organization of the control plane of the communication network N, its resources can be distributed in a plurality of items of equipment that are remote from one another and configured to cooperate together in the implementation of management and control functions of the communication network N which are assigned to the control plane manager device CP.

Figure 4:
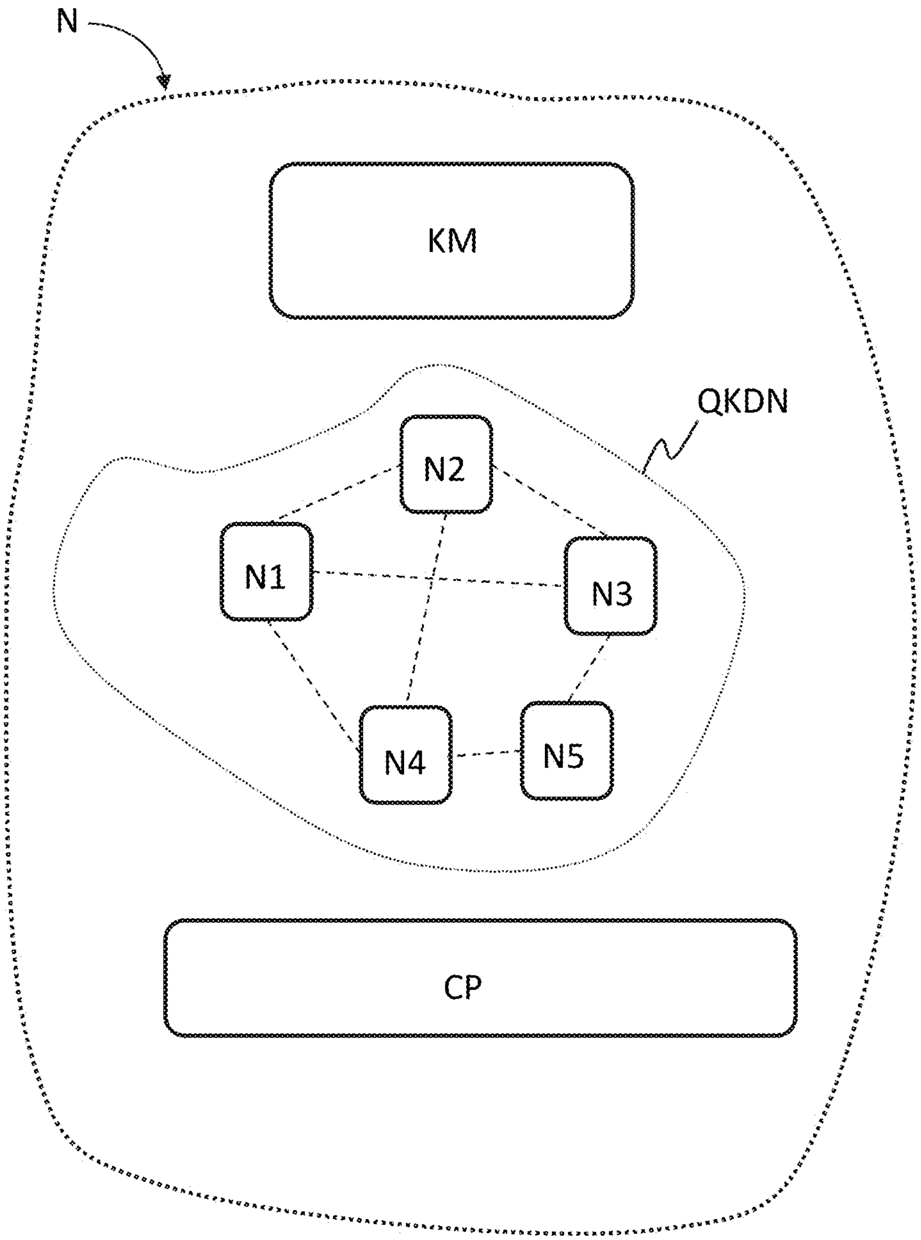
FIG. 4 schematically illustrates a quantum key distribution network included in the communication network already illustrated in FIG. 3, according to one embodiment.

The control plane manager device CP is configured to be connected to the other devices of the communication network N and consequently can communicate with any transmission node operating in the communication network N, and with the key manager device KM, under the control of a control unit internal to the control plane manager device CP. According to the example described, the control plane manager device CP is not connected to the quantum key distribution network QKDN of the communication network N, as represented graphically in FIG. 4, since the quantum key distribution network QKDN is used only for the transmission of quantum keys between adjacent nodes. The double-arrows indicated in FIG. 3 between each of the transmission nodes N1, N2, N3, N4 and N5 of the communication network N and the key manager device KM, or between the control plane manager device CP and each of the transmission nodes N1, N2, N3, N4 and N5, or even between the control plane manager device CP and the key manager device KM, represent communication links via the IP communication layer, and the dotted-line links in the same FIG. 3 represent links established via optical transmission means suitable for carrying out quantum key transmissions in the quantum communication layer.

An example internal architecture of the internal control unit of the control plane manager device CP is described later with reference to FIG. 7.

Figure 5:
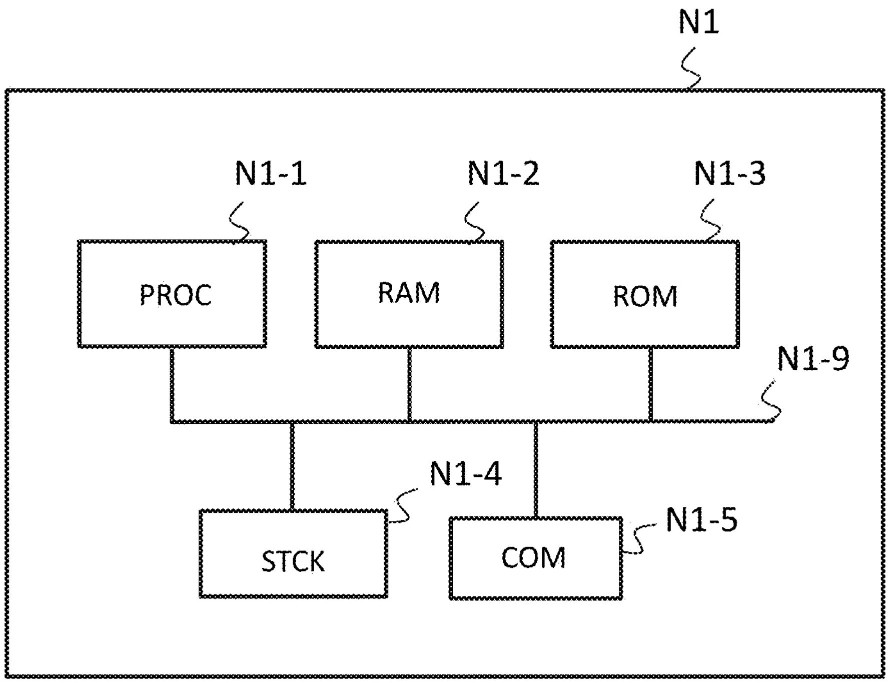
FIG. 5 illustrates an example internal architecture of a transmission node such as that described with reference to FIG. 1, FIG. 2 and FIG. 3, according to one embodiment.

FIG. 5 schematically illustrates an example internal architecture of a transmission node among the transmission nodes N1 to N5 of the communication network 1. Consider by way of illustration that FIG. 5 illustrates an internal arrangement of the transmission node N1. It is noted that FIG. 5 could also schematically illustrate an example hardware architecture of the transmission node N2, N3, N4 or N5.

According to the example hardware architecture represented in FIG. 5, the transmission node N1 then comprises, connected by a communication bus N1-9: a processor or CPU (Central Processing Unit) N1-1; a RAM (Random Access Memory) N1-2; a ROM (Read-Only Memory) N1-3; a storage unit such as a hard disk (or a storage medium reader, such as an SD (Secure Digital) card reader) N1-4; at least the communication interface N1-5 enabling the transmission node N1 to communicate with devices present in the communication network N such as for example the transmission nodes N2, N3, N4 or N5, the key manager device KM or the control plane manager device CP.

The processor N1-1 is capable of executing instructions loaded into the RAM N1-2 from the ROM N1-3, from an external memory (not represented), from a storage medium (such as an SD card) or from a communication network. When the transmission node N1 is powered up, the processor N1-1 is capable of reading instructions from the RAM N1-2 and executing them. These instructions form a computer program bringing about the implementation, by the processor N1-1, of all or part of a content transmission method described with reference to FIG. 11, or FIG. 8 and FIG. 9.

All or part of a method described with reference to FIG. 11, FIG. 8 and FIG. 9, or described variants of this method, can be implemented in software form by the execution of a set of instructions by a programmable machine, for example a DSP (Digital Signal Processor) or a microcontroller, or be implemented in hardware form by a dedicated component or machine, for example an FPGA (Field-Programmable Gate Array) or an ASIC (Application-Specific Integrated Circuit). In general, the transmission node N1 comprises the electronic circuitry configured to implement the methods described in relation to it. Of course, the transmission node N1 additionally comprises all the elements usually present in a system comprising a control unit and its peripherals, such as a power supply circuit, a power supply monitoring circuit, one or more clock circuits, a reset circuit, input-output ports, interrupt entries, bus drivers, etc., this list being non-exhaustive.

Figure 6:
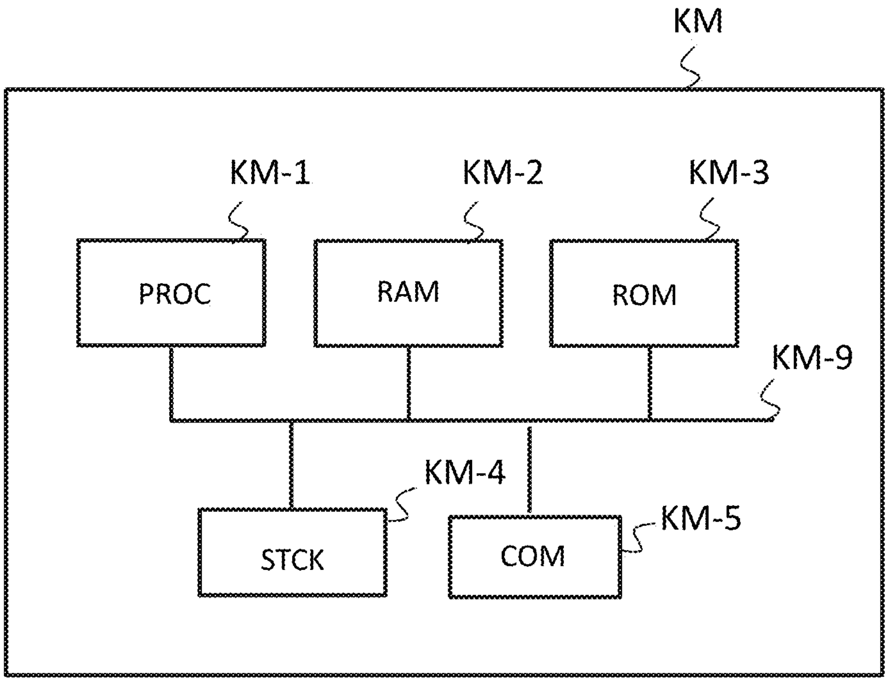
FIG. 6 illustrates an example internal architecture of a key manager device such as that described with reference to FIG. 1, FIG. 2 and FIG. 3, according to one embodiment.

FIG. 6 schematically illustrates an example internal architecture of the key manager device KM. Consider by way of illustration that FIG. 6 illustrates an internal arrangement of the key manager device KM.

According to the example hardware architecture represented in FIG. 6, the key manager device KM then comprises, connected by a communication bus KM-9: a processor or CPU (Central Processing Unit) KM-1; a RAM (Random Access Memory) KM-2; a ROM (Read-Only Memory) KM-3; a storage unit such as a hard disk (or a storage medium reader, such as an SD (Secure Digital) card reader) KM-4; at least the communication interface KM-5 enabling the key manager device KM to communicate with devices present in the communication network N such as for example the transmission nodes N1, N2, N3, N4 and N5 or the control plane manager device CP.

The processor KM-1 is capable of executing instructions loaded into the RAM KM-2 from the ROM KM-3, from an external memory (not represented), from a storage medium (such as an SD card) or from a communication network. When the key manager device KM is powered up, the processor KM-1 is capable of reading instructions from the RAM KM-2 and executing them. These instructions form a computer program bringing about the implementation, by the processor KM-1, of all or part of a content transmission method described with reference to FIG. 11, or FIG. 8 and FIG. 9, or described variants of this method.

All or part of the methods described with reference to FIG. 11, FIG. 8 and FIG. 9, or their described variants, can be implemented in software form by the execution of a set of instructions by a programmable machine, for example a DSP (Digital Signal Processor) or a microcontroller, or be implemented in hardware form by a dedicated component or machine, for example an FPGA (Field-Programmable Gate Array) or an ASIC (Application-Specific Integrated Circuit). In general, the key manager device KM comprises the electronic circuitry configured to implement the methods described in relation to it. Of course, the key manager device KM additionally comprises all the elements usually present in a system comprising a control unit and its peripherals, such as a power supply circuit, a power supply monitoring circuit, one or more clock circuits, a reset circuit, input-output ports, interrupt entries, bus drivers, etc., this list being non-exhaustive.

Figure 7:
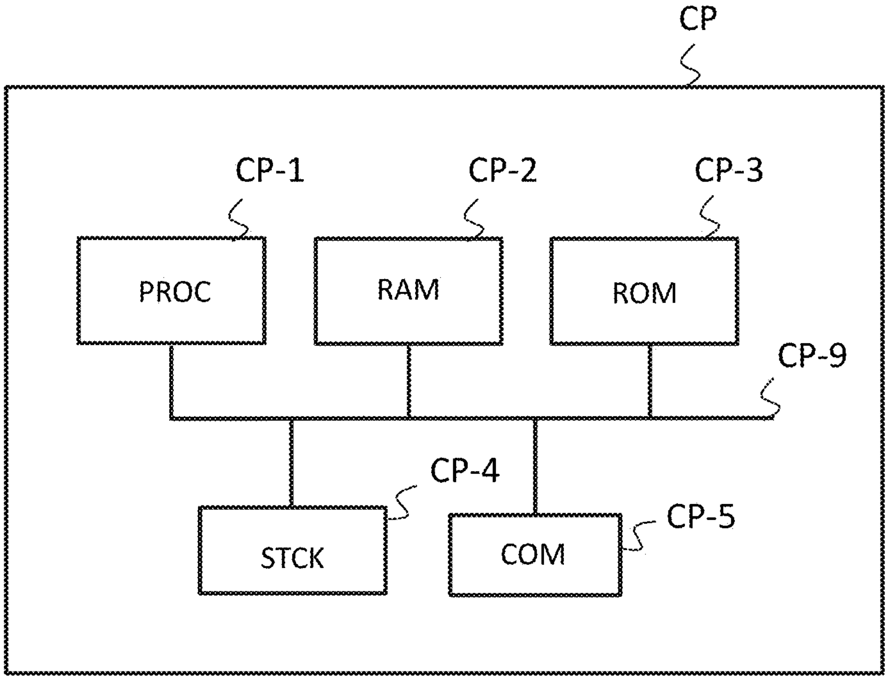
FIG. 7 illustrates an example internal architecture of a control plane manager device such as that described with reference to FIG. 3 and FIG. 4, according to one embodiment.

FIG. 7 schematically illustrates an example internal architecture of the control plane manager device CP.

According to the example hardware architecture represented in FIG. 7, the control plane manager device CP then comprises, connected by a communication bus CP-9: a processor or CPU (Central Processing Unit) CP-1; a RAM (Random Access Memory) CP-2; a ROM (Read-Only Memory) CP-3; a storage unit such as a hard disk (or a storage medium reader, such as an SD (Secure Digital) card reader) CP-4; at least the communication interface CP-5 enabling the control plane manager device CP to communicate (via the IP layer) with devices present in the communication network N such as for example the transmission nodes N1, N2, N3, N4 and N5, and the key manager device KM.

The processor CP-1 is capable of executing instructions loaded into the RAM CP-2 from the ROM CP-3, from an external memory (not represented), from a storage medium (such as an SD card) or from a communication network. When the control plane manager device CP is powered up, the processor CP-1 is capable of reading instructions from the RAM CP-2 and executing them. These instructions form a computer program bringing about the implementation, by the processor CP-1, of all or part of a method for transmitting content, such as for example content A, through the communication network N, as described with reference to FIG. 11 or described variants of this method.

All or part of the methods described with reference to FIG. 11, FIG. 8 or FIG. 9, or their described variants, can be implemented in software form by the execution of a set of instructions by a programmable machine, for example a DSP (Digital Signal Processor) or a microcontroller, or be implemented in hardware form by a dedicated component or machine, for example an FPGA (Field-Programmable Gate Array) or an ASIC (Application-Specific Integrated Circuit). In general, the control plane manager device CP comprises the electronic circuitry configured to implement the methods described in relation to it. Of course, the control plane manager device CP additionally comprises all the elements usually present in a system comprising a control unit and its peripherals, such as a power supply circuit, a power supply monitoring circuit, one or more clock circuits, a reset circuit, input-output ports, interrupt entries, bus drivers, etc., this list being non-exhaustive.

Figure 8:
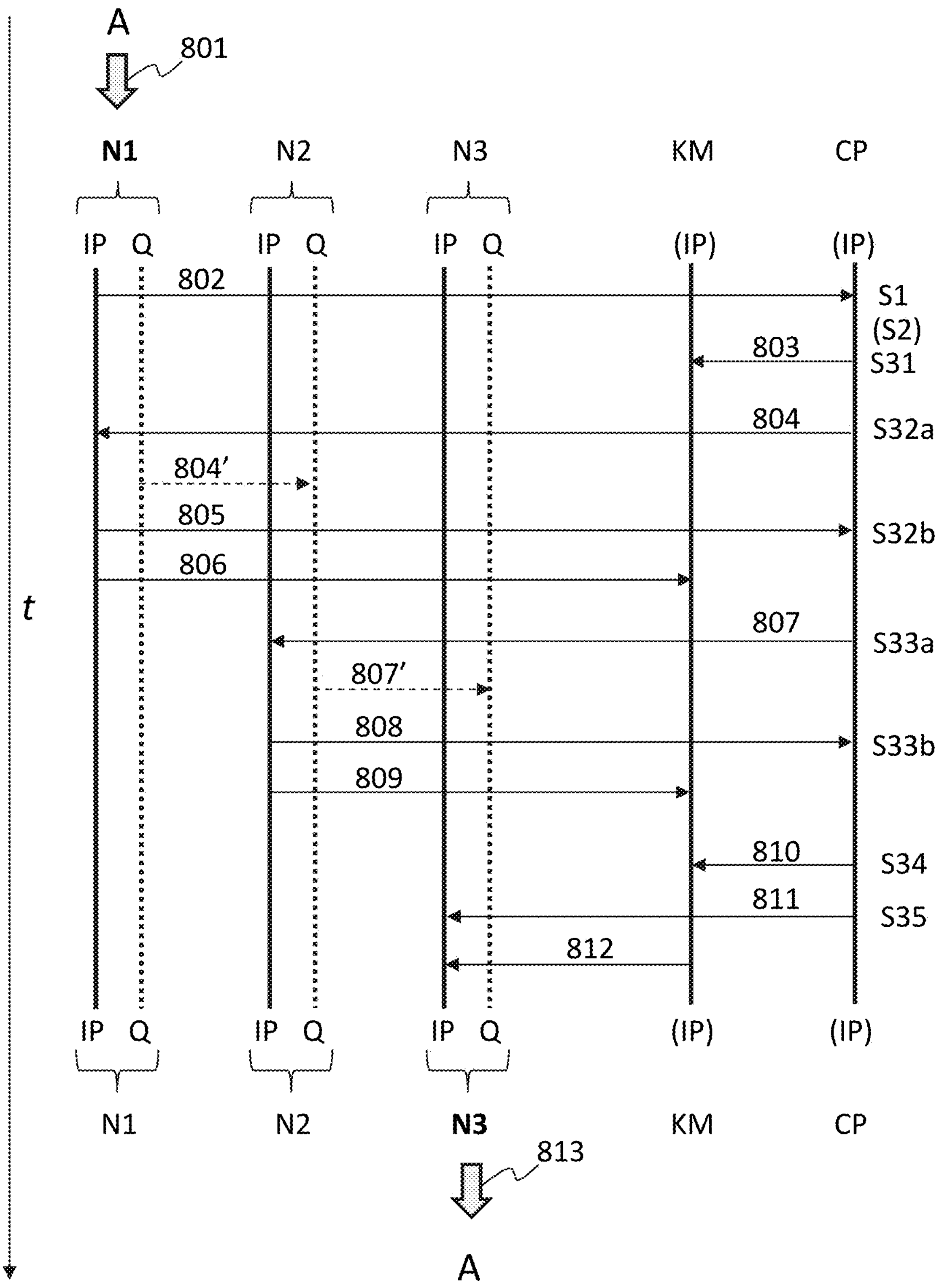
FIG. 8 is a diagram illustrating a sequencing of operations which is implemented according to a method for transmitting content A between two transmission nodes of a communication network, via an intermediate communication node, according to one embodiment.

An example of transmission of content A between the transmission node N1 and the transmission node N3 of the communication network N is illustrated in FIG. 8. FIG. 8 represents a sequencing of operations (or sequences or steps) between the various devices connected to the communication network N and cooperating to carry out the transfer of content A via the communication network N. According to the example described, the transmission node N1 is the source transmission node and the transmission node N3 is the recipient transmission node. The content transfer process uses the intermediate node N2 between the source transmission node N1 and the recipient transmission node N3. The set {N1; N2; N3} forms a determined route R for the transmission of content A via the communication network N.

Prior to the sequencing illustrated with reference to FIG. 8, a software module at a level higher than the network layer carrying out the transmission of content A sends content A to said network layer in a message 801. In FIG. 8, the successive control messages triggering the operations successively carried out are represented by horizontal arrows between the elements involved, i.e., the transmission nodes N1, N2 and N3, the key manager device KM and the control plane manager device CP. Each of the transmission nodes is illustrated by a vertical double bar (IP layer denoted by "IP" and quantum layer denoted by "Q"). Reading from top to bottom corresponds to a progress in time, symbolized by the vertical arrow labelled t in FIG. 8. It is considered here that the sending of a message has negligible duration and that an arrow representing it is consequently horizontal. According to one embodiment, content A is transmitted in its entirety to the transmission node N1. According to a variant, content A is fragmented into a plurality of fragments and the process described hereafter is repeated as much as needed for transmitting the whole of content A by successive transmissions of the fragments of content A. The message 801 contains information according to which content A is intended to be transmitted to the transmission node N3 of the communication network N. The network layer of the transmission node N1, which layer is configured to collaborate with the transmission of content A, then sends to the control plane manager device CP, during a step S1, a message 802 requesting transmission of content A. This message 802 requesting transmission of content A contains information according to which the recipient transmission node for content A is the transmission node N3. During a step S2 (not being associated with sending a control message), the control plane manager device CP determines a route (in this case, the route R={N1; N2; N3}) in the communication network. The route R is determined for example so as to optimize the transmission time for content A in the communication network N, or determined as a function of the reliability of the transmission links between the various transmission nodes of the communication network N, or according to a combination of the two. According to another example, the determination of a route depends on the quantum keys available in the quantum key buffer memories of all or some of the quantum interfaces of the transmission nodes. These examples are clearly not limiting and a route R between the source transmission node and the recipient transmission node can be determined in any way. Details of implementation of a method for determining a route R between a source transmission node and a recipient transmission node via one or more successive intermediate nodes are not expanded upon here insofar as that is not useful for a good understanding of the invention. The person skilled in the art will know how to choose an algorithm for determining a route from among multiple routing possibilities depending on the typology of the communication network N and on any other parameters or requirements. According to one embodiment, the control plane manager device CP obtains a route determined by and from a third-party device configured to carry out such a route determination as a function of one or more predefined parameters.

Once the route R is obtained, the control plane manager device CP having received the request to transmit content A assigns a service identifier (a number, for example) ServId to the content transmission, providing for creating a reference common to any required operation in connection with this transmission of content A between the source transmission node and the recipient transmission node. This assigning is also carried out during step S2. The control plane manager device CP then sends, during a step S31, a control message 803 to the key manager device KM. This message 803 contains the assigned service identifier ServId, thereby enabling the control plane manager device CP to perform actions in association with the transfer of content A in the communication network N, according to other control messages to arrive. The control plane manager device CP then determines and carries out a precise sequencing in order to organize the transfer of content A via the determined route. Thus, a first control message is sent to the source transmission node, then control messages are successively sent to all the intermediate nodes of the route, and lastly a control message is sent to the recipient transmission node. This control message sent to the recipient node is preceded by a control message sent to the key manager device KM, which can then indicate to the recipient transmission node that it is the last transmission node of the determined route in association with the transmission service identified via the service identifier ServId; the indicating action enables the recipient node to perform actions which are specific to it.

Thus, a control message 804 is sent by the control plane manager device CP to the transmission node N1 during a step S32*a*, which control message 804 contains the service identifier ServId and an identifier of a quantum key emission interface of the transmission node N1, or more specifically of a quantum interface of the quantum module QN1 of the transmission node N1. The choice of the quantum key emission interface is determined in order that the quantum module QN1 can send a quantum key to the next transmission node in the route which is the determined route R for the transmission of content A in the communication network N. To this end, each of the transmission nodes N1, N2 and N3 has previously notified the control plane manager device CP of the number of quantum key emission interfaces that it has and which adjacent transmission node device each of its interfaces is connected to. These notifications are made at a prior stage for recognizing characteristics of transmission nodes that are interconnected to form the communication network N.

The control message 804 therefore enables the transmission node N1 to know to which following transmission node along the determined route R it must send a quantum key, enabling this same node to carry out subsequent operations, participating in the secure transmission of content A, in particular by carrying out a key derivation function and by directing the result of this operation to the key manager device KM. In order to respond to the reception of the control message 804, the transmission node N1 transmits in a message 804' a quantum key k11 to the transmission node N2 defined as being the next transmission node in the determined route. The transmission node N1 then sends a control message 805, during a step S32*b*, in response to the control message 804 which it has received.

The control message 805 sent by the transmission node N1 to the control plane manager device CP contains the service identifier ServId used as common reference for any control message in connection with the transmission of content A in the communication network N, and an identifier of the quantum key transmitted to the transmission node N2

(the next node in the determined route) to be considered to carry out the subsequent operations which this transmission node is tasked with. Additionally, the transmission node N1, source node, carries out a key derivation function KDF, in this case of the xor type, between content A and the quantum key sent to the transmission node N2, and directs its results to the key manager device KM in a control message 806 additionally containing the service identifier ServId. According to a substantially similar process, except for the fact that the next node in the determined route R is not the source node, but in fact an intermediate node, the control plane manager device CP then sends to the intermediate transmission node N2, during a step S33*a*, a control message 807, which control message 807 contains the service identifier ServId and a quantum key transmission interface identifier to be used to send, from the transmission node N2, a quantum key to the next transmission node in the determined route R, in this case and according to the example described, the recipient transmission node N3. Similarly to that which was implemented by the source transmission node N1, the intermediate transmission node N2 sends a quantum key k21 to the transmission node N3 (the next one in the determined route) in a message 807', and a control message 808, during a step S33*b*, in response to the received control message 807, and a control message 809 to the key manager KM. The control message 809 sent to the key manager KM contains the result of a key derivation function KDF applied to the quantum key received from the previous node and to the quantum key sent to the next node, accompanied by the service identifier ServId. For its part, the key manager KM carries out a key derivation function KDF, in this case the xor function, between the result previously received from the transmission node N1 (source node) and the result received from the transmission N2 (intermediate node) and preserves this result. The control plane manager device CP then sends a control message 810, during a step S34, to the key manager device KM, considering that the next transmission node in the determined route R is the recipient node N3. The control message 810 contains, in addition to the service identifier ServId, information according to which the next transmission node, in this case the transmission node N3, is the recipient transmission node for content A, i.e., in other words the last node in the determined route R. This information forms an end-of-sequence identifier. According to an example implementation, the end-of-sequence identifier is a specific code such as, for example, the code "FF". According to one embodiment, this code is transmitted in a data field provided to transport a sequence number such as a unique sequence identifier of a series of unique sequence identifiers, which series is determined for the transmission of content A in association with the service identifier ServId. This control message enables the key manager device KM to know that it must send to the recipient transmission node a control message containing the end result of the successive key derivation function KDF operations which it has carried out. This end result is in this case, and according to the example of transmission already described with reference to FIG. 2: (A⊕k11)⊕(k11⊕k21). The control plane manager device CP moreover sends, during a step S35, a control message 811 to the recipient transmission node N3. This control message 811 contains, in addition to the service identifier ServId, a quantum key identifier to be considered for carrying out a subsequent operation for determining content A from the quantum key received from the previous intermediate transmission node in the determined route and from the end result of key derivation operations which is received from the key manager device KM. The end result of the operations carried out by the key manager device KM is sent to the recipient transmission node N3 in a control message 812. Lastly, the recipient node device N3 sends content A in a message 813 to an application layer or at least to an application module of the transmission node N3 configured to receive content A or even the fragment of content A concerned if content A is transmitted in a fragmented manner by a succession of executions of the sequencing described previously.

Overall and to summarize, the sequencing of operations aiming to transmit content A, or if necessary a fragment of content A, between a source transmission node and a recipient transmission node, via possibly a plurality of intermediate transmission nodes, according to a determined route R, comprises the sending and receiving of control messages, by the control plane manager device CP, successively, to each of the transmission nodes forming the determined route R (for transmission), considered here as the "current transmission node", such that:

- the current transmission node sends, via one of its quantum key transmission interfaces, a quantum key to the next node in the determined route, except if the current node is the recipient transmission node,
- the current transmission node sends to the key manager device KM a result of a key derivation function KDF applied to a received quantum key, on the one hand, and a sent quantum key, on the other hand, when the current transmission node is an intermediate transmission node, or a result of this key derivation function KDF applied to content A or to a fragment of content A on the one hand, and a sent quantum key, on the other hand, when the current transmission node is the source transmission node,
- the current transmission node receives from the key manager device KM an end result of successive key derivation operations and determines content A or a fragment of content A, if necessary, when the current transmission node is the recipient node.

To that end, the control plane manager device CP additionally sends, prior to these control messages, a first control message (or prior message) to the key manager device KM, when the current transmission node is the source node, and a second control message (or end-of-sequence message) to the key manager device KM when the current transmission node is the recipient transmission node. The first message sent to the key manager device KM comprises a transmission service identifier ServId and the second message sent to the key manager device KM contains information according to which the current transmission node is the recipient transmission node for content A or a fragment of content A, if necessary.

It emerges from the above summary that the method for transmitting content A as described is also functional between a source transmission node and a recipient transmission node when these two transmission nodes are adjacent in the communication network N, i.e., in the absence of an intermediate transmission node between the source transmission node and the recipient transmission node. Indeed, there is nothing to exclude content from being directed between two adjacent transmission nodes.

In such cases, the source transmission node (for example N1) carries out a key derivation function KDF between content A to be transmitted (or a fragment of this content if necessary) and a quantum key which it has available (k11, for example), and then transmits the result thereof, rel, to the key manager device KM, in addition to the fact that it transmits this quantum key k11 to the next transmission node i.e. the recipient node (for example N2). For its part, the recipient node (in this case N2) therefore receives, from the key manager device KM, the result rel of the key derivation function KDF previously carried out by the source node, and carries out a new key derivation function KDF between this received result rel and the received quantum key k11, so as to recover the transmitted content A. Thus, and even in the absence of an intermediate transmission node in the determined (direct) route, the transmission of the content is secure since $((A \oplus k11) \oplus k11) = A$ with $rel = (A \oplus k11)$ which transits via the key manager device KM.

According to the example embodiment described here, the key derivation function KDF is the xor function. This example is not however limiting and another key derivation function KDF exhibiting the same properties according to which when said function KDF is applied to two data items a and b, referred to as input data, the result re=KDF (a, b) of said function applied to said two data items is null when said two data items a and b are equal to each other, and the result re=KDF (a, b) of said function KDF applied to said two data items a and b is equal to one of said two data items from among a and b when the other of said two data items from among a and b is null.

According to one embodiment, an acknowledgement of receipt is delivered to the transmitter of a control message by the recipient of the control message for each of the control messages described. This concerns control messages sent from the transmission nodes, the key manager device KM and the control plane manager device CP. This notably advantageously provides for detecting a malfunction or an interruption in a transmission link in the communication network N.

A communication network is subjected to reductions in communication performance due to congestion or malfunctions, and monitoring of network performance can lead to determining a new route R for the transmission of content, either before the start of the transmission or during transmission.

Figure 9:
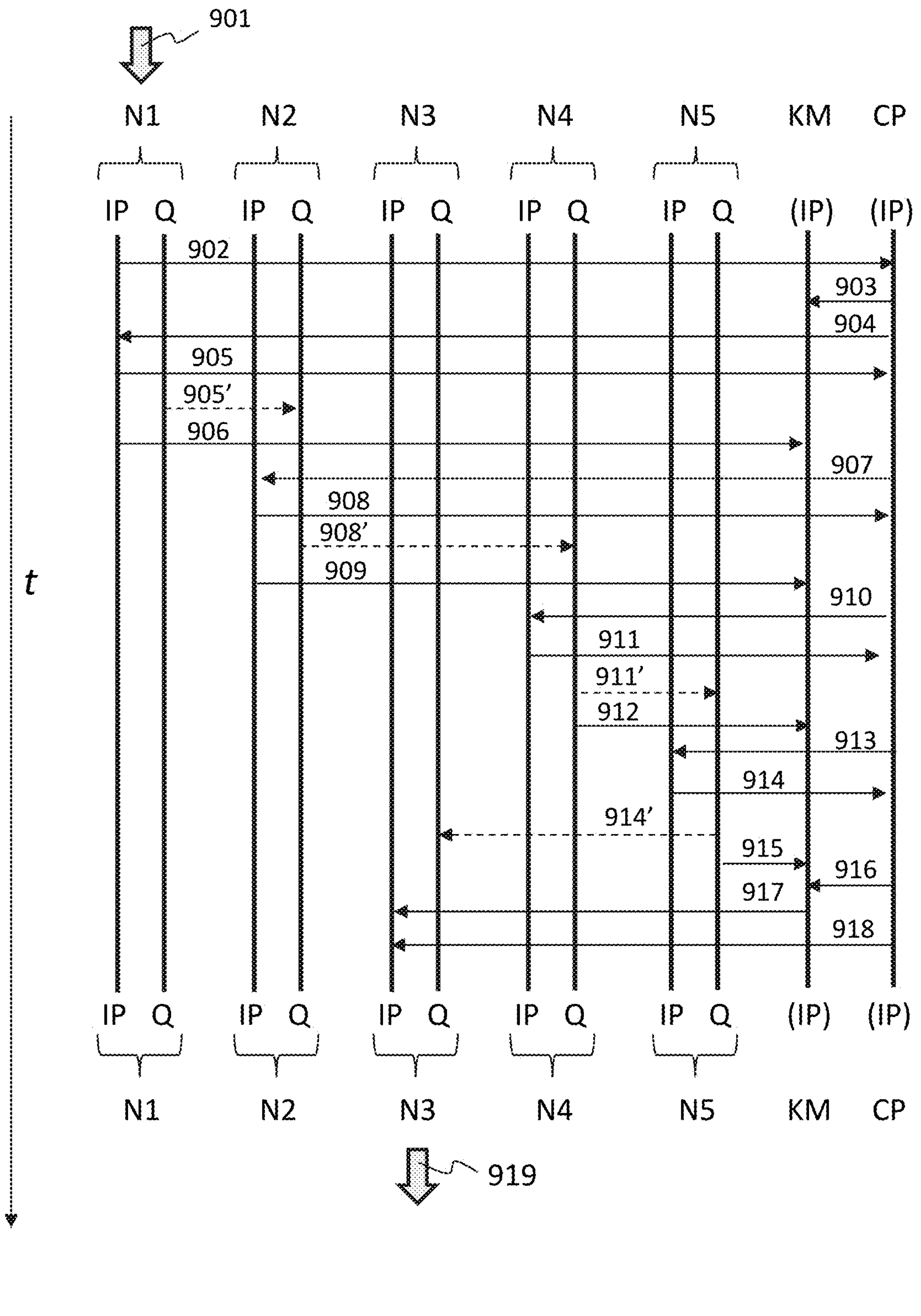
FIG. 9 is a diagram illustrating a sequencing of operations which is implemented according to a method for transmitting content A between two transmission nodes of a communication network, via three intermediate transmission nodes, according to one embodiment.

FIG. 9 describes a sequencing of operations suitable for a transmission of content A in the communication network N when the communication link of the quantum layer of the communication network N already described is interrupted between the transmission node N2 and the transmission node N3, still in the case of a transmission between the source transmission node N1 and the recipient transmission node N3. According to the example described with reference to FIG. 9, the route R' determined by the control plane manager device CP is then R'={N1; N2; N4; N5; N3}. After receiving content A in a message 901, at the transmission node N1, the source transmission node N1 sends to the control plane manager device CP a message 902 containing a request to transmit content A to the transmission node N3. The control plane manager device CP determines the route R'={N1; N2; N4; N5; N3} providing for avoiding a quantum key transmission between the transmission node N2 and the transmission node N3, the useful link to do this being faulty, as well as a service identifier ServId specific to this transmission via this determined route R'. The control plane manager device CP then sends this service identifier ServId to the key manager device KM in a control message 903. Then, just as according to the example described previously with reference to FIG. 8, for each of the source and successive intermediate transmission nodes N1, N2, N4 and N5 defining the determined route R' {N1; N2; N4; N5; N3} to the recipient transmission node N3, the control plane manager device CP sends a control message determining to which quantum key transmission interface the current transmission node must direct a quantum key, and receives a message containing a quantum key identifier which must be processed by the next transmission node in the determined route. The sending of the control message to the current transmission node additionally triggers the sending, by the transmission node configured for this purpose, of a message containing the result of a key derivation operation, via a key derivation function KDF, to the key manager device KM. Thus, the control plane manager device CP successively sends a control message 904 to the source transmission node N1 which responds to it by a control message 905, a control message 907 to the intermediate transmission node N2 which responds to it by a control message 908, a control message 910 to the intermediate transmission node N4 which responds to it by a control message 911, and a control message 913 to the intermediate transmission node N5 which responds to it by a control message 914. These control messages trigger respectively the transmission of quantum keys in messages 905', 908', 911' and 914'. Lastly, the control plane manager device CP directs a control message 916 to the key manager device KM containing information according to which the next transmission node is the recipient node, such that the key manager device KM transmits, in a message 917, the end result of successive key derivation function operations which it has carried out based on messages 906, 909, 912 and 915 received from each of the source and intermediate nodes defining the determined route R' to the recipient node N3 and each containing a result of a key derivation operation carried out by the transmission node originating the message in question. The control plane manager device CP then sends a control message 918 to the recipient transmission node N3, which message contains a quantum key identifier to be considered to recover content A based on the end result received from the key manager device KM and on the quantum key received from the previous transmission node in the determined route R'. The recipient transmission node N3 then transmits, in a message 919, the reconstructed content A to an application module of the recipient transmission node N3 intended to receive it. In the same way as for the example of transmission already described with reference to FIG. 8, content A can be transmitted as a whole according to the method described above, or broken down into fragments such that the fragments are successively transmitted during successive iterations of the method described above.

According to one embodiment, the control messages sent by the control plane manager device CP to the source transmission node or to the intermediate transmission nodes each contain a unique sequence identifier SeqNum of a series of unique sequence identifiers which series is determined for the transmission of content A in association with the service identifier ServId. According to this embodiment, each unique sequence identifier of the series of unique sequence identifiers is suitable for determining the rank of a sequence (or operation, or step) with which it is associated in a series of sequences defined in association with the transmission of content A. This advantageously provides for defining an order to carry out successive operations performed by the key manager device KM for the case in which the key derivation function used by the key manager KM does not exhibit properties of commutativity that enable it to carry out successive operations, the results of which are independent of the sequencing, as is the case for the xor function, for example, applied to two input data items a and b. Furthermore, the use of a unique sequence identifier provides for operating while modifying the determined route during transmission of content A in the event of a transmission node malfunctioning, by taking up the routing from a previous node in the route determined by the control plane manager device.

Still according to this embodiment, each of the transmission nodes is configured to relay to the key manager device KM, in the message containing a key derivation function result, the unique sequence identifier which it has received from the control plane manager CP. According to a variant, the transmission nodes are not configured to relay to the key manager device KM the unique sequence identifiers received from the control plane manager device CP, and the latter directly sends these unique identifiers, defined consistently (for example, following an incremental order), such that the key manager device KM knows how to organize the operations to be carried out according to respective values of these unique identifiers received from the control plane manager device CP.

Figure 11:
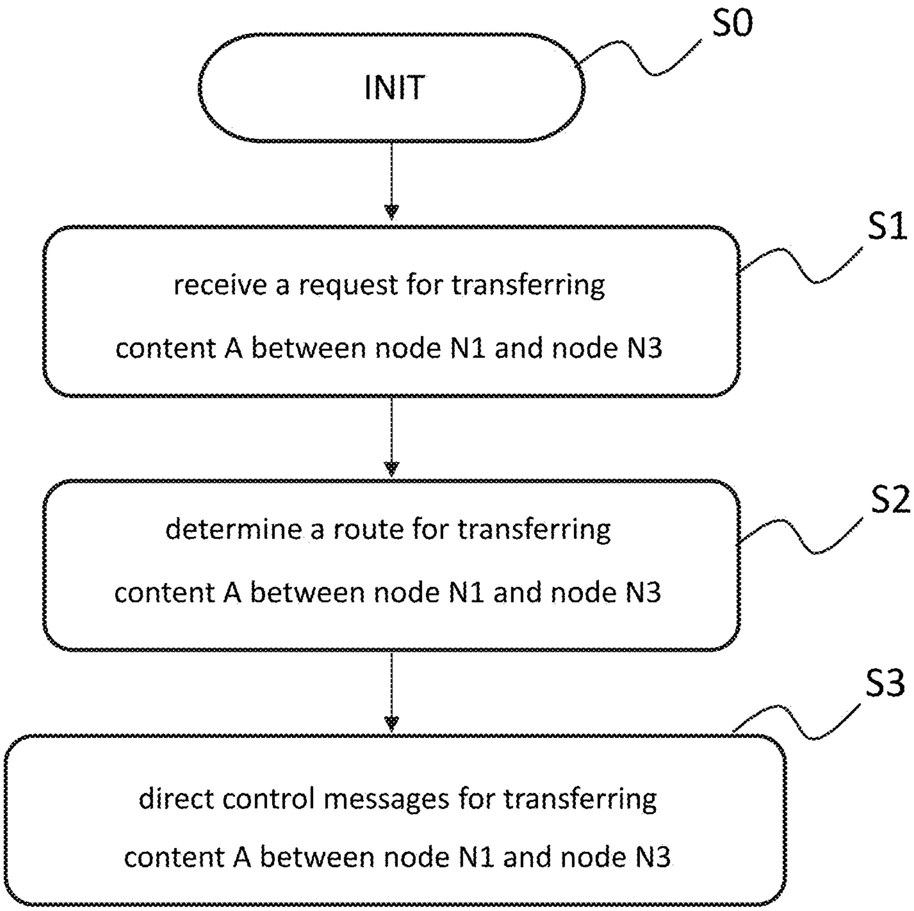
FIG. 11 is a flow chart illustrating a method for transmitting content A between two transmission nodes of a communication network, via at least one intermediate communication node, executed in a control plane manager device according to one embodiment.

FIG. 11 is a flow chart illustrating the steps of a method for transmitting content A through the communication network N, between the transmission node N1, referred to as source node, and the transmission node N3 referred to as recipient node. A step S0 corresponds to an initialization step at the end of which the group of transmission nodes N1, N2 and N3 are configured to carry out, in a nominal manner, communications via IP communication links, and quantum key transmissions via the quantum key distribution network QKDN. At the end of step S0, the key manager device KM and the control plane manager device CP are also configured and ready to operate. In particular, each of the transmission nodes is ready to receive, from an application layer or an application module, a message containing a request to transmit content in the communication network N. During step S1, the source node N1 receives a message containing a request to transmit content A to the recipient node N3, also called transmission request message. The source node N1 having then interpreted that it must operate as source node, sends a message to request transmission of content A to the control plane manager device CP, configured to organise content transmissions in the communication network N. The control plane manager device CP then determines, during step S2, a route R for transmitting content A in the communication network N. According to the example described here, the determined route R comprises the transmission node N2 referred to as intermediate node N2. The control plane manager device furthermore determines a service identifier ServId, associated with the determined route R, which identifier can be used as reference for any subsequent action that is useful for the transmission of content A through the communication network N, and notably to make reference to this transmission of content A in control messages which it defines to organize the interactions between the transmission nodes N1, N2, N3, the key manager device KM and itself. Lastly, during step S3, the control plane manager device CP determines and sends successive control messages to carry out the transmission of content A, using the quantum key distribution network QKDN to secure to the best extent the transmission of content A. According to the example described here, the control messages for the transfer of content A at step S3 are the messages 803 to 813 as described with reference to FIG. 8 or equivalent messages (potentially containing additional information).

According to one embodiment of the invention, the control messages exchanged during step S3 contain additional information, in addition to that useful for the transmission of content A according to the method described. For example, such information can serve to prevent the use of two identical quantum keys.

According to one embodiment, a quantum key identifier can be a quantum key length and each of the quantum keys generated in the same transmission node have a different length, at least in the same reference period.

The content transmission method executed by the control plane manager device CP advantageously provides for carrying out an end-to-end control of the operations required for a secure transmission of content A by offering a very high level of security in view of the use of a quantum key distribution network. It is thus possible to prevent a number of attacks, notably “man in the middle” attacks. Advantageously, such a method additionally provides for carrying out routing modifications during transmission. The method is furthermore compatible with quantum keys of any size.

For reasons of performance and infrastructure cost, the quantum distribution network QKDN used for the distribution of quantum keys between the transmission nodes which form it is dedicated to this use. Thus, only quantum keys pass through the quantum network QKDN. The control messages for their part pass between transmission nodes and the control plane manager device CP, between transmission nodes and the key manager device KM, or between the latter and the control plane manager device CP. In particular, the quantum key identifiers used according to the protocol for transmitting content in the communication network N generally transit via “conventional” IP communication links, in essence less secure than the optical quantum links used for quantum key transmissions.

According to one embodiment, and for the purposes of further securing the transmission of content in the communication network N, the quantum key identifiers transmitted in control messages are each transmitted in the form of a hash value of the quantum key that is transmitted or to be transmitted which they identify. Thus, for example, an identifier KIDnj providing for making reference to a quantum key Knj that is transmitted or to be transmitted from a quantum interface Qj of a transmission node Nn, is the hash value KIDnj=H (Knj) where H is the hash function used.

A quantum key hash value (or hash, or hashcode) is determined (calculated) so as to be unique for each quantum key possibly used. To that end, a quantum key constructed by a quantum key generator is used only once. The term “hash value” in this case denotes the result of a cryptographic hash function H applied to a quantum key that is transmitted or to be transmitted, for identifying this quantum key with regard to further processing during which reference is made to this quantum key.

Figure 12:
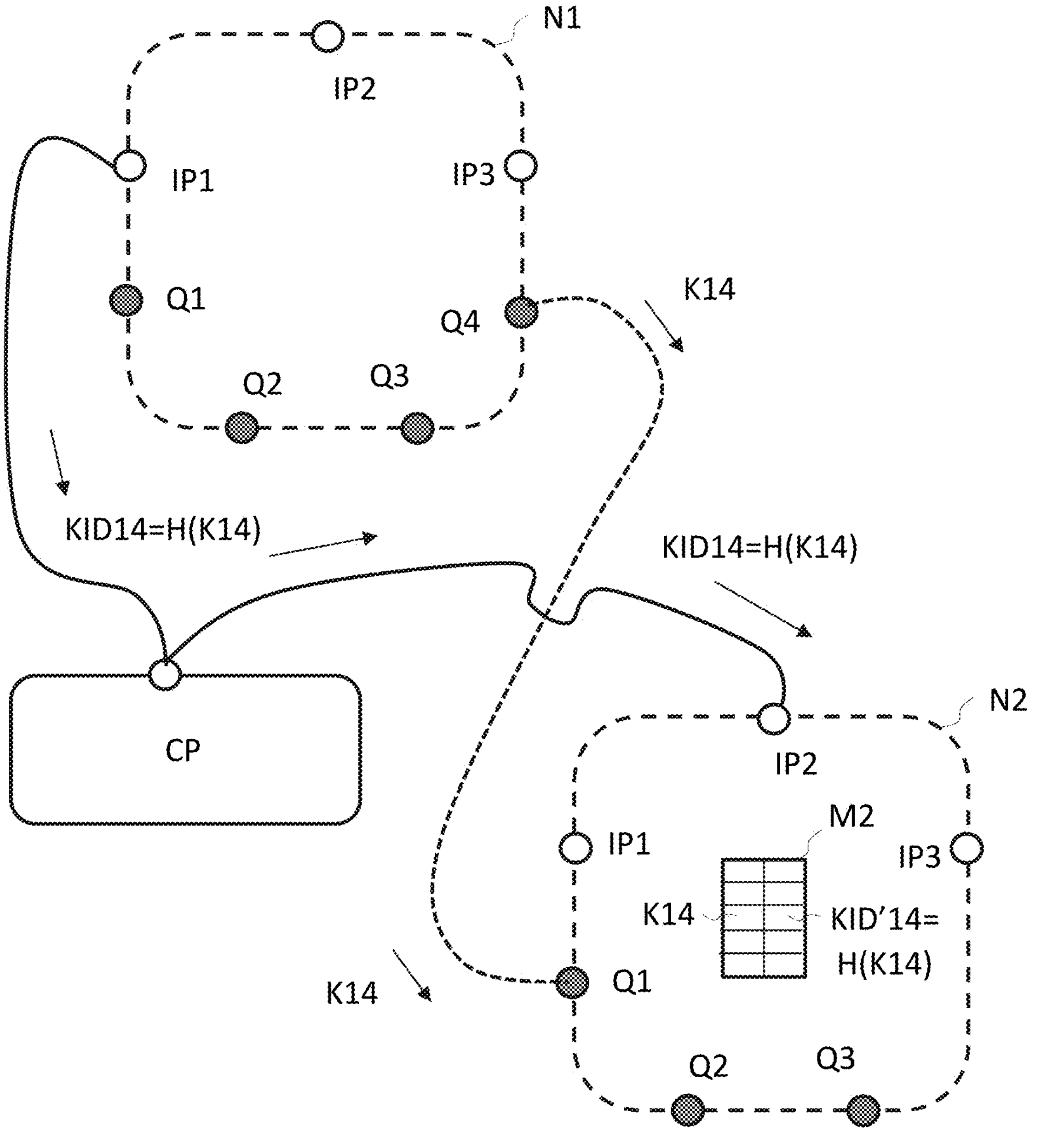
FIG. 12 is a diagram illustrating a quantum key transmission between two transmission nodes of a communication network comprising a transmission of a quantum key identifier in the form of a quantum key hash value, according to one embodiment.

FIG. 12 illustrates the transmission of a first hash value KID14 of a quantum key K14 transmitted between the transmission nodes N1 and N2 of the communication network N according to a step of the content transmission protocol described in the present application. The hash value is in this case used as an identifier of the quantum key K14 in view of one or more further processing operations. The hash value KID14 is calculated by the transmission node N1, by applying the hash function H to the quantum key K14. According to one embodiment, the hash function H is the function SHA-256 of the well-known SHA-2 family of hashing algorithms, or the function SHA-512. This example is not limiting and another hash function can be used, such as, for example, MD4 or MD5. The quantum key K14 is transmitted by the transmission node N1 from its quantum interface Q4 to the transmission node N2. The hash value KID14 calculated by the transmission node N1 acts as identifier of the quantum key K14 in a first control message transmitted from the transmission node N1 to the control plane manager device CP, then in a second subsequent control message transmitted from the control plane manager CP to the node N2 which is the next node in the determined route for transmitting content between a source transmission node and a recipient transmission node. Upon receiving the quantum key K14, the transmission node N2 for its part performs a hash value calculation by applying the same hash function H as that previously used by the transmission node N1 and hence obtains a second hash value KID'14 which, except in the case of a malfunction-related calculation error, is equal to the first hash value KID14 calculated by the transmission node N1. The transmission node N2 which has received the quantum key K14, then saves this quantum key K14 in association with the second hash value KID'14, in a memory M2, which is preferably internal to it. The memory M2 contains an ordered list of quantum keys in order that each of the quantum keys stored there is associated with a quantum key identifier which is a hash value of the quantum key. The term "list" is used here in a broad manner and also comprises the case of a list with only one item (a single quantum key and its identifier in the form of a hash value of this quantum key).

Advantageously, the use of a hash value, result of a hash function H, increases the overall transmission security and reduces the attack surface of such a transmission in the communication network N.

Cleverly, and to achieve this, each of the transmission nodes present in the communication network N and comprising at least one quantum interface (for example the transmission nodes N1 and N2) comprise, in addition to means for generating, storing and transmitting a quantum key, electronic and/or computing-related circuitry configured to:

carry out a hash function H having as input (data) variable a quantum key Knj which is transmitted or to be transmitted to an adjacent transmission node, transmit a first hash value KIDnj, result of this hash function H applied to said quantum key Knj that is transmitted or to be transmitted, via a preferably non-quantum transmission link and to the control plane manager device CP, in a control message established according to the method for transmitting content in the communication network N, and to:

carry out the hash function H having as input (data) variable said quantum key Knj received from an adjacent transmission node to obtain a second hash value KID'nj (identical to the first hash value KIDnj, except in the event of malfunctioning) and save in a memory, preferably internal, the second hash value KID'nj in association with said received quantum key Knj, receive, from said control plane manager CP, via a preferably non-quantum communication link, the first hash value KIDnj acting as identifier of a quantum key Knj, and, identify the received quantum key Knj, in view of carrying out further processing operations, by comparing the first received hash value KIDnj with a list of hash values containing the second hash value KID'nj determined.

By being configured that way, each transmission node thus equipped can direct a quantum key Knj to another transmission node on the network and direct a highly secure identifier KIDnj of this quantum key Knj to the control plane manager device CP which will then be able to direct this identifier to the next node in the determined route in order to perform a transfer of content in the communication network N. The next node will know how to recover the quantum key Knj concerned, by running through its memory in which the determined hash values of received quantum keys are stored, in order to carry out if necessary a key derivation function, and to direct its result to the key manager device KM as well as any subsequent operation that is useful for implementing a transfer of content according to the method described. According to one embodiment, the method for transmitting a quantum key identifier in the form of a hash value comprises a concatenation of the quantum key with a salt, to further increase the security level. According to this embodiment, the salt is known by all the transmission nodes, through configuration. In this case, the salt used for the hashing of the quantum key can be fixed or even vary with time. For example, a new salt common to all the transmission nodes can be directed regularly to the transmission nodes of the communication network N, or they can each comprise a table of salts.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for transmitting content between two transmission nodes of a communication network comprising said two transmission nodes and at least one other transmission node referred to as intermediate transmission node, said transmission nodes being additionally contained in a quantum key distribution network of keys referred to as quantum keys, the communication network comprising a key manager device connected to said transmission nodes and connected to said quantum key distribution network, said transmission nodes each comprising a plurality of communication interfaces to communicate in the communication network and a plurality of quantum key transmission interfaces to transmit and receive said quantum keys in said quantum key distribution network, and said transmission nodes being additionally configured to each carry out a key derivation function and to direct a result thereof to said key manager device and to each carry out a key extraction function based on information received from said key manager device and a quantum key, said communication network additionally comprising a control plane manager device configured to execute the following steps:

receive, from a node, referred to as source node, from among said two transmission nodes, a request message requesting transmission of said content to the other node, referred to as recipient node, from among said two transmission nodes, said request message containing an identifier of said recipient node, obtain a route determined as passing through said at least one intermediate transmission node or through a series of intermediate transmission nodes between said transmission node and said recipient node, and a service identifier for transmission of said content associated with said route, send and receive control messages to and from said transmission nodes and to said key manager device, suitable for generating transmissions of keys between pairs of nodes from among said nodes, defined according to said determined route in association with said transmission service identifier, wherein the method comprises:

emitting a control message to or from said control plane manager, wherein when a control message emitted to or from said control plane manager contains an identifier of a quantum key that is transmitted or to be transmitted between the two transmission nodes, the identifier is a hash value of said quantum key that is transmitted or to be transmitted, and, wherein the sending and receiving of said control messages comprise:

sending, to said key manager device, a control message containing said service identifier, sending, to said source node, a control message containing at least said service identifier and an identifier of a quantum key emission interface, receiving, from said source node, a control message containing at least a quantum key identifier in the form of a hash value of said quantum key and said service identifier for transmission of said content, sending, to each intermediate transmission node, a control message containing at least said service identifier, a quantum key reception interface identifier, an identifier of a quantum key that is received or to be received comprising a hash value of said quantum key via said quantum key reception interface, and a quantum key emission interface identifier, receiving, from each intermediate transmission node, a control message containing at least a quantum key identifier in the form of a hash value of said quantum key and said service identifier for transmission of said content, sending, to said key manager device, a control message containing an end-of-sequence identifier and an identifier of the recipient node, and, sending, to said recipient node, a control message containing at least said service identifier, a quantum key reception interface identifier and a quantum key identifier in the form of a hash value of said quantum key that is received or to be received via said quantum key reception interface.

2. The method according to claim 1, wherein the sending of the control message to said source node and the sending of a control message to each of said intermediate nodes additionally comprise a unique sequence identifier of a series of unique sequence identifiers which series is determined for said transmission of said content in association with said service identifier, each unique sequence identifier of said series of unique sequence identifiers being suitable for determining a rank of a sequence with which the unique sequence identifier is associated in a series of sequences which is defined in association with said transmission of said content.

3. The method according to claim 1, wherein the key derivation function exhibits properties according to which said function is applied to two data items referred to as input data, and a result of said function applied to said two data items is null when said two data items are equal to each other and the result of said function applied to said two data items is equal to one of said two data items when the other of said two data items is null.

4. The method according to claim 3, wherein the key derivation function is a function referred to as "exclusive OR" and wherein said two data items comprise binary words of identical size.

5. A communication network comprising:

a control plane manager device configured to control transmission of content between two transmission nodes of said communication network additionally comprising said at least one other transmission node referred to as intermediate transmission node, said transmission nodes being additionally contained in a quantum key distribution network of keys referred to as quantum keys; and, a key manager device connected to said transmission nodes and connected to said quantum key distribution network, said transmission nodes each comprising a plurality of communication interfaces to communicate in the communication network and a plurality of quantum key transmission interfaces to transmit and receive said quantum keys in said quantum key distribution network, and said transmission nodes being additionally configured to each carry out a key derivation function and to direct a result thereof to said key manager device and to each carry out a key extraction function based on information received from said key manager device and a quantum key, wherein said control plane manager device comprises electronic circuitry and is configured to:

receive, from a node, referred to as source node, from among said two transmission nodes, a request message requesting transmission of said content to the other node, referred to as recipient node, from among said two transmission nodes, said request message containing an identifier of said recipient node, obtain a route determined as passing through said at least one intermediate transmission node or through a series of intermediate transmission nodes between said source node and said recipient node, and a service identifier for transmission of said content associated with said route, transmit and receive control messages to and from said transmission nodes and to said key manager device, suitable for generating transmissions of keys between pairs of nodes from among said nodes, defined according to said determined route in association with said transmission service identifier, and wherein, when a control message transmitted to or from said control plane manager contains an identifier of a quantum key that is transmitted or to be transmitted between two transmission nodes, the identifier is a hash value of said quantum key that is transmitted or to be transmitted, and wherein the control plane manager device is further configured to:

send, to said key manager device, a control message containing said service identifier, send, to said source node, a control message containing at least said service identifier, and an identifier of a quantum key emission interface, receive, from said source node, a control message containing at least a quantum key identifier in the form of a hash value of said quantum key and said service identifier for transmission of said content, send, to each intermediate transmission node, a control message containing at least said service identifier, a quantum key reception interface identifier and an identifier of a quantum key that is received or to be received comprises a hash value of said quantum key via said quantum key reception interface, and a quantum key emission interface identifier, receive, from each intermediate transmission node, a control message containing at least a quantum key identifier in the form of a hash value of said quantum key and said service identifier for transmission of said content, send, to said key manager device, a control message containing an end-of-sequence identifier and an identifier of the recipient node, and, send, to said recipient node, a control message containing at least said service identifier, a quantum key reception interface identifier, and an identifier of a quantum key that is received or to be received in the form of a hash value of said quantum key via said quantum key reception interface.

6. The communication network according to claim 5, wherein the control plane manager device is further configured to insert into the control message to said source node and into the control message to each of said intermediate nodes a unique sequence identifier of a series of unique sequence identifiers which series is determined for said transmission of said content in association with said service identifier, each unique sequence identifier of said series of unique sequence identifiers being suitable for determining a rank of a sequence with which the unique sequence identifier is associated in a series of sequences which is defined in association with said transmission of said content.

7. The communication network according to claim 5 comprising a plurality of transmission nodes, wherein each of the transmission nodes is configured to:

send a control message to the key manager device, said message directed to said key manager device containing a key derivation function result, said service identifier and a sequence identifier of a series of unique sequence identifiers, which series is determined for said transmission of said content in association with said service identifier, each unique sequence identifier of said series of unique sequence identifiers being suitable for determining a rank of a sequence with which the unique sequence identifier is associated in a series of sequences which is defined in association with said transmission of said content, and receive from said key manager device a control message containing said service identifier and a key derivation function result.

* * * * *